(12) United States Patent
Shobu et al.

(10) Patent No.: US 11,236,710 B2
(45) Date of Patent: Feb. 1, 2022

(54) ENGINE SYSTEM AND ENGINE CONTROL METHOD

(71) Applicant: Komatsu Ltd., Tokyo (JP)

(72) Inventors: Kenichi Shobu, Tokyo (JP); Haruki Kaneko, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/982,073

(22) PCT Filed: Mar. 30, 2020

(86) PCT No.: PCT/JP2020/014522
§ 371 (c)(1),
(2) Date: Sep. 18, 2020

(87) PCT Pub. No.: WO2021/199147
PCT Pub. Date: Oct. 7, 2021

(65) Prior Publication Data
US 2021/0301769 A1  Sep. 30, 2021

(51) Int. Cl.
*F02M 26/35* (2016.01)
*F02M 35/10* (2006.01)
(Continued)

(52) U.S. Cl.
CPC ......... *F02M 26/35* (2016.02); *B01D 46/0063* (2013.01); *B01D 46/444* (2013.01);
(Continued)

(58) Field of Classification Search
CPC ............ F02M 26/35; F02M 35/10222; F02M 35/10386; F02M 26/17; F02M 26/14;
(Continued)

(56) References Cited

U.S. PATENT DOCUMENTS 6,370,935 B1     4/2002  He et al.
2011/0072796 A1*  3/2011  Van Nieuwstadt .... F02M 26/02
                                                          60/285

(Continued)

FOREIGN PATENT DOCUMENTS

EP         0791736 A2    8/1997
JP         H09-203350 A  8/1997
(Continued)

*Primary Examiner* — Xiao En Mo
(74) *Attorney, Agent, or Firm* — Locke Lord LLP

(57) ABSTRACT

An engine system includes: an engine main body; an intake pipe; a mass flow sensor that is provided in the intake pipe and outputs a measurement value of an amount of air passing through the intake pipe; an exhaust pipe; a removal device that is provided in the exhaust pipe and removes an air pollutant included in an exhaust gas passing through the exhaust pipe; a recirculation pipe; a recirculation valve that controls a flow rate of the exhaust gas flowing from the recirculation pipe to the intake pipe; a regeneration control unit that closes the recirculation valve; an air amount calculation unit that calculates a theoretical value of an amount of air flowing to the intake side of the engine main body on the basis of a quantity of state of the engine main body during the regeneration process; and a correction unit.

11 Claims, 10 Drawing Sheets

(51) Int. Cl.
  *F02M 26/14* (2016.01)
  *F02M 26/17* (2016.01)
  *F02D 41/00* (2006.01)
  *B01D 46/44* (2006.01)
  *B01D 46/46* (2006.01)
  *B01D 46/00* (2006.01)

(52) U.S. Cl.
  CPC ......... *B01D 46/46* (2013.01); *F02D 41/0077* (2013.01); *F02M 26/14* (2016.02); *F02M 26/17* (2016.02); *F02M 35/10222* (2013.01); *F02M 35/10386* (2013.01); *B01D 2279/30* (2013.01)

(58) Field of Classification Search
  CPC .............. F02D 41/0077; B01D 46/444; B01D 46/0063; B01D 46/46; B01D 2279/30
  See application file for complete search history.

(56) References Cited

U.S. PATENT DOCUMENTS

| | | | | |
|---|---|---|---|---|
| 2013/0081366 | A1* | 4/2013 | Ikeda | F02D 41/0005 55/282.3 |
| 2013/0167509 | A1* | 7/2013 | Nishimura | F02D 41/0007 60/274 |
| 2015/0219029 | A1* | 8/2015 | Nakashima | F02D 41/0052 123/703 |
| 2015/0240729 | A1* | 8/2015 | Shimizu | F02D 41/30 60/285 |
| 2018/0274413 | A1* | 9/2018 | Dobson | B01D 53/9495 |
| 2019/0032593 | A1* | 1/2019 | Kanno | F01N 3/2066 |

FOREIGN PATENT DOCUMENTS

| | | |
|---|---|---|
| JP | 2001-107797 A | 4/2001 |
| JP | 2004-270462 A | 9/2004 |
| JP | 2006-009745 A | 1/2006 |
| JP | 2007-231884 A | 9/2007 |
| JP | 2011-157942 A | 8/2011 |
| JP | 2013-019399 A | 1/2013 |
| JP | 5941534 B2 | 6/2016 |

* cited by examiner

| AMOUNT OF AIR (kg/min) | CORRECTION VALUE |
|---|---|
| 4-6 | 1.055 |
| 6-8 | 1.050 |
| 8-10 | 1.052 |
| 10-12 | 1.049 |
| 12-14 | 1.051 |
| 16-18 | 1.050 |

FIG. 4

| AMOUNT OF AIR (kg/min) | AVERAGE MEASUREMENT VALUE OF MAF (kg/min) | AVERAGE THEORETICAL VALUE OF MCF (kg/min) | NUMBER OF SAMPLES |
|---|---|---|---|
| 4-6 | 3.5 | 3.7 | 2500 |
| 6-8 | 6.8 | 7.1 | 19900 |
| 8-10 | 7.5 | 7.9 | 20200 |
| 10-12 | 11.2 | 11.7 | 30505 |
| 12-14 | 13.6 | 14.3 | 19268 |
| 16-18 | 12.1 | 12.7 | 8026 |

ENGINE SYSTEM AND ENGINE CONTROL METHOD

TECHNICAL FIELD

The present disclosure relates to an engine system and an engine control method.

BACKGROUND ART

In some cases, an engine is provided with a mass flow sensor that measures the amount of air on an intake side. As a configuration of the mass flow sensor, a hot wire type is known which applies a current to a hot wire provided in an intake pipe to heat the hot wire and measures the amount of current flowing through the hot wire to measure the amount of air. The air passing through the intake pipe takes away heat from the hot wire and the resistance of the hot wire changes. Further, as the amount of air passing through the intake pipe becomes larger, the amount of heat taken away from the hot wire becomes larger. Therefore, the mass flow sensor can measure the amount of current flowing through the hot wire to measure the amount of air.

It is known that, in the hot-wire-type mass flow sensor, for example, dust included in air adheres to the hot wire, resulting in a decrease in the accuracy of measurement. Patent Literature 1 discloses a technique which calculates a correction value for a measurement value on the basis of a measurement value of a mass flow sensor and the amount of intake air calculated on the basis of the number of rotations of the engine and supercharging pressure when the engine is in a steady operation state.

CITATION LIST

Patent Literature

[Patent Literature 1]
Japanese Unexamined Patent Application, First Publication No. 2001-107797

SUMMARY OF INVENTION

Technical Problem

In a case in which the engine has an exhaust gas recirculation (EGR) system that recirculates part of the exhaust gas to the intake side, the amount of air flowing to the intake side of the engine is represented by the sum of the amount of air taken from the outside and the flow rate of the EGR system. Therefore, it is considered that the correction value is accurately calculated by interrupting the recirculation of the exhaust gas by the EGR system to match the amount of air flowing to the intake side of the engine with the amount of air taken from the outside.

In a case in which the recirculation of the exhaust gas is interrupted in order to calculate the amount of intake air, it is necessary to calculate the amount of intake air after a change in the amount of air due to the interruption is stabilized. However, in a case in which the vehicle is a work machine, such as a hydraulic excavator, the steady state of the engine is unlikely to last for a long time while the work machine is in operation. Therefore, the chance of calculating the correction value is reduced.

An object of the present disclosure is to provide an engine system and an engine control method that can accurately correct a measurement value of a mass flow sensor during a normal operation of a work machine.

Solution to Problem

According to an aspect of the present disclosure, there is provided an engine system including: an engine main body; an intake pipe that is connected to an intake side of the engine main body; a mass flow sensor that is provided in the intake pipe and outputs a measurement value of an amount of air passing through the intake pipe; an exhaust pipe that is connected to an exhaust side of the engine main body; a removal device that is provided in the exhaust pipe and removes an air pollutant included in an exhaust gas passing through the exhaust pipe; a recirculation pipe that connects the exhaust side of the engine main body and the intake pipe; a recirculation valve that controls a flow rate of the exhaust gas flowing from the recirculation pipe to the intake pipe; a regeneration control unit that closes the recirculation valve to perform a process of regenerating the removal device; an air amount calculation unit that calculates a theoretical value of an amount of air flowing to the intake side of the engine main body on the basis of a quantity of state of the engine main body during the regeneration process; and a correction unit that corrects the measurement value on the basis of the measurement value and the theoretical value during the regeneration process.

Advantageous Effects of Invention

According to the above-mentioned aspect, the engine system can accurately correct the measurement value of the mass flow sensor during the normal operation of the work machine.

BRIEF DESCRIPTION OF DRAWINGS

FIG. 4 is a diagram illustrating an example of information stored in a sample storage unit according to the first embodiment.

DESCRIPTION OF EMBODIMENTS

First Embodiment

<<Configuration of Engine System 1>>

Figure 1:
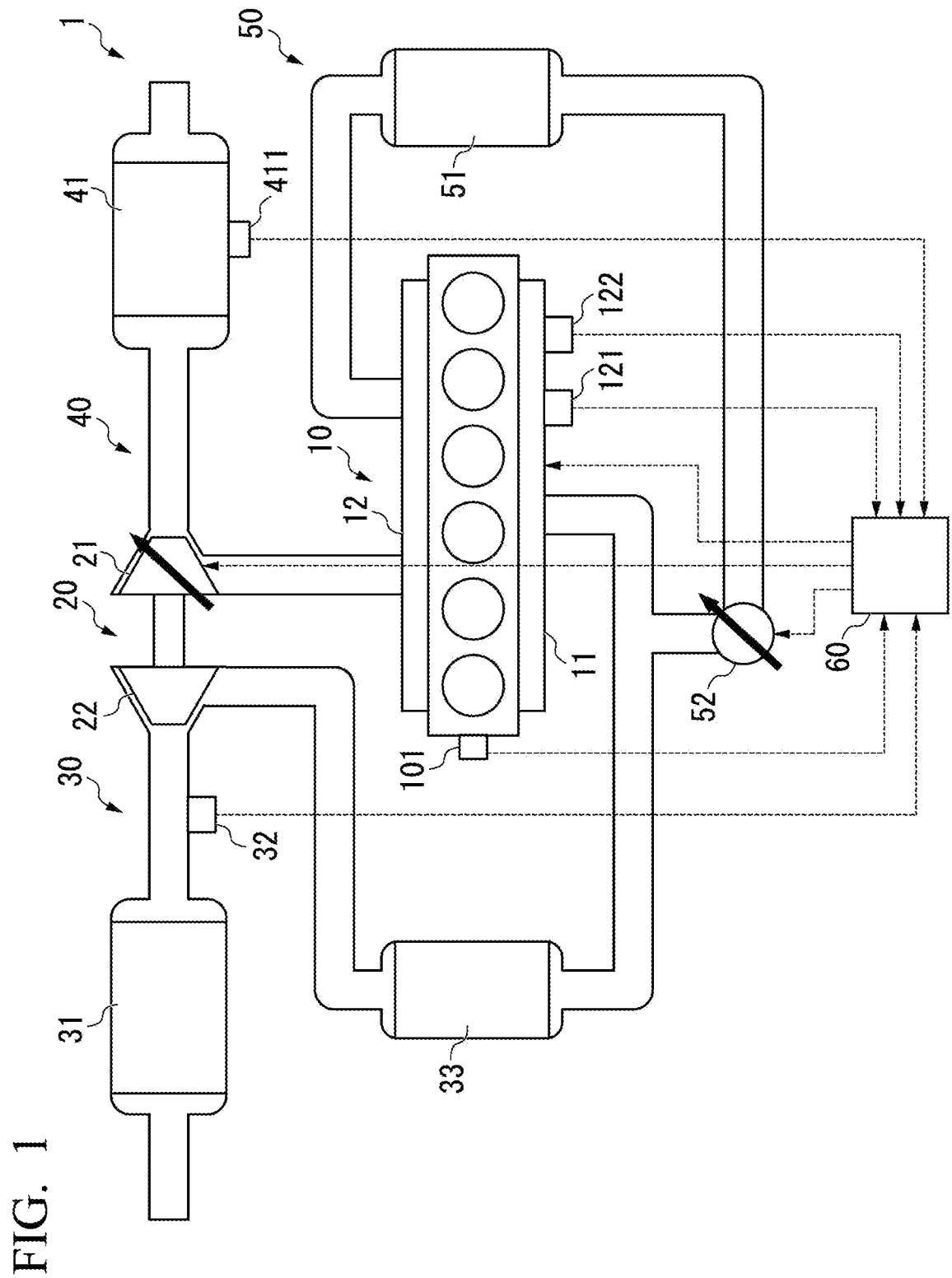
FIG. 1 is a schematic diagram illustrating a configuration of an engine system according to a first embodiment.

Hereinafter, embodiments will be described in detail with reference to the drawings. FIG. 1 is a schematic diagram illustrating a configuration of an engine system 1 according to a first embodiment.

The engine system 1 includes an engine main body 10, a supercharger 20, an intake pipe 30, an exhaust pipe 40, a recirculation pipe 50, and an engine controller 60.

The engine main body 10 is a diesel engine in which a plurality of combustion chambers are formed. The engine main body 10 is provided with an intake manifold 11 that distributes air to each combustion chamber and an exhaust manifold 12 that collects exhaust gas discharged from each combustion chamber. The engine main body 10 is provided with a rotation speed sensor 101 that measures the rotation speed of the engine main body 10. The intake manifold 11 is provided with a temperature sensor 121 that measures the temperature of the intake manifold 11 and a pressure sensor 122 that measures the pressure of the intake manifold 11.

The supercharger 20 increases the density of air flowing into the engine main body 10 using the exhaust gas discharged from the engine main body 10. The supercharger 20 includes a turbine 21 provided in the exhaust pipe 40, a compressor 22 provided in the intake pipe 30, and a variable nozzle (not illustrated). An arrow illustrated in the turbine 21 in FIG. 1 indicates that an exhaust flow rate is variable. The compressor 22 is connected to the turbine 21 and is driven. The compressor 22 is driven by the rotation of the turbine 21 to perform intake air supercharging to the engine main body 10. Further, the engine controller 60 controls the degree of opening of the variable nozzle to adjust the number of rotations of the turbine 21. In addition, a supercharger 20 according to another embodiment may include a fixed nozzle or an exhaust throttle valve, instead of the variable nozzle.

The intake pipe 30 connects the outside air and the intake manifold 11 of the engine main body 10. An air cleaner 31, a mass flow sensor 32, the compressor 22 of the supercharger 20, and an aftercooler 33 are provided in the intake pipe 30 in order from the upstream side.

The air cleaner 31 filters intake air using a filter and prevents a foreign matter, such as dust, from entering the engine main body 10.

The mass flow sensor 32 includes a hot wire (not illustrated) that is provided in the intake pipe 30. The mass flow sensor 32 applies a current through the hot wire to heat the hot wire and measures the amount of current flowing through the hot wire to measure the amount of air. That is, the mass flow sensor 32 measures the amount of outside air (mass air flow (MAF)) flowing into the intake pipe 30. The mass flow sensor 32 is also called an MAF sensor.

The aftercooler 33 cools the air compressed by the supercharger 20.

The exhaust pipe 40 connects the exhaust manifold 12 of the engine main body 10 and the outside air. The turbine 21 of the supercharger 20 and a diesel particulate filter (DPF) 41 are provided in the exhaust pipe 40 in order from the upstream side.

The DPF 41 is a removal device that removes a particulate matter included in the exhaust gas discharged from the engine main body 10. The particulate matter is an example of air pollutants. The DPF 41 has, for example, silicon carbide as a base material. The particulate matter included in the exhaust gas is collected when passing through pores formed in the DPF 41. The collected particulate matter is burned by oxygen included in the exhaust gas when the temperature of the exhaust gas reaches a temperature at which oxidation reaction occurs. Therefore, when the pores of the DPF 41 are saturated due to the collection of the particulate matter, the particulate matter is burned to regenerate the collection function of the DPF 41. The DPF 41 is provided with a differential pressure sensor 411 that measures the differential pressure between the upstream side and the downstream side of the DPF 41.

The recirculation pipe 50 connects the exhaust manifold 12 of the engine main body 10 and the intake pipe 30. The recirculation pipe 50 extracts a portion of the exhaust gas from the exhaust manifold 12 and recirculates it to the intake pipe 30. The recirculation pipe 50 includes a recirculation cooler 51 and a recirculation valve 52 in order from the upstream side. The recirculation cooler 51 cools the exhaust gas from the exhaust manifold 12. The recirculation valve 52 adjusts the flow rate of the exhaust gas flowing from the recirculation pipe 50 to the intake pipe 30. An arrow illustrated in the recirculation valve 52 in FIG. 1 indicates that the degree of opening is variable. The recirculation pipe 50 recirculates (refluxes) part of the exhaust gas to the intake manifold 11 to reduce the concentration of oxygen in the intake air, thereby reducing the combustion temperature of the engine main body 10. Therefore, the amount of nitrogen oxide included in the exhaust gas is reduced. Both the exhaust pipe 40 and the recirculation pipe 50 according to the first embodiment are connected to the exhaust manifold 12. However, in another embodiment, the recirculation pipe 50 may be branched from the exhaust pipe 40.

<<Configuration of Engine Controller 60>>

The engine controller 60 adjusts a fuel injection amount, a fuel injection timing, the variable nozzle of the supercharger 20, and the recirculation valve 52 according to the amount of operation of an operation device, such as an accelerator pedal (not illustrated), and the measurement values of various sensors to control the number of rotations and torque of the engine. In this case, the engine controller 60 corrects the measurement value of the mass flow sensor 32 according to deterioration. That is, the engine controller 60 corrects the measurement value of the mass flow sensor 32 according to a reduction in the accuracy of measurement caused by the attachment of, for example, dust included in the air to the hot wire of the mass flow sensor 32. Further, the engine controller 60 determines whether or not the DPF 41 needs to be regenerated on the basis of the measurement value of the differential pressure sensor 411 and performs a process of regenerating the DPF 41.

Figures 2, 3:
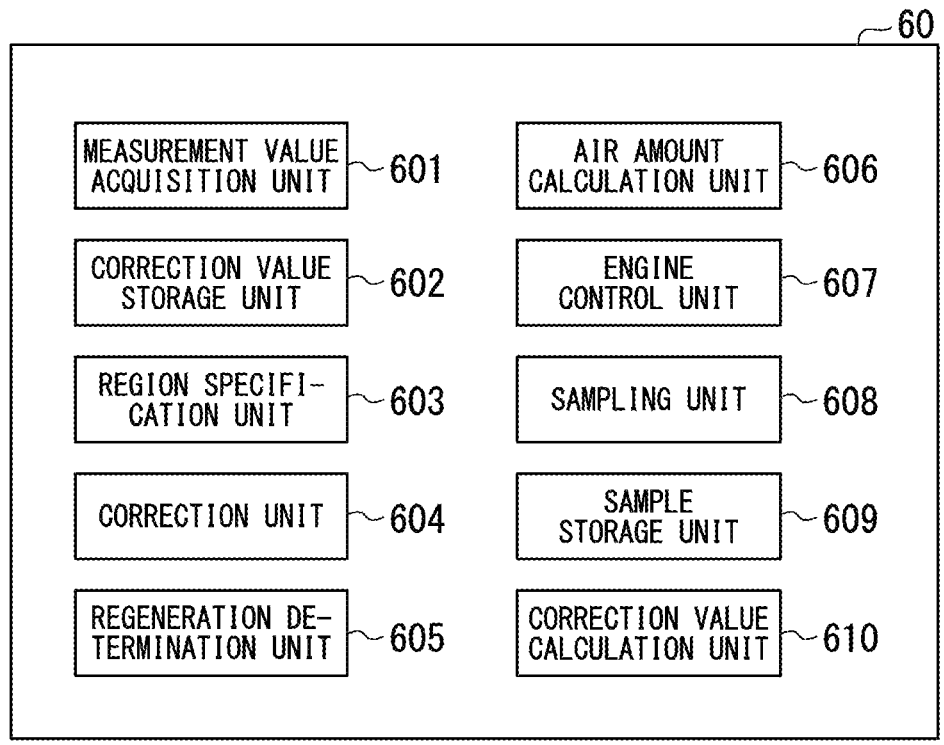
FIG. 2 is a schematic block diagram illustrating a configuration of an engine controller according to the first embodiment.
FIG. 3 is a diagram illustrating an example of information stored in a correction value storage unit according to the first embodiment.

FIG. 2 is a schematic block diagram illustrating the configuration of the engine controller 60 according to the first embodiment.

The engine controller 60 includes a measurement value acquisition unit 601, a correction value storage unit 602, a region specification unit 603, a correction unit 604, a regeneration determination unit 605, an air amount calculation unit 606, an engine control unit 607, a sampling unit 608, a sample storage unit 609, and a correction value calculation unit 610.

The measurement value acquisition unit 601 acquires measurement values from the mass flow sensor 32, the rotation speed sensor 101, the temperature sensor 121, the pressure sensor 122, and the differential pressure sensor 411.

The correction value storage unit 602 stores a correction value for correcting the measurement value of the mass flow sensor 32, that is, the measurement value of the amount of air passing through the intake pipe 30. Hereinafter, the measurement value of the amount of air passing through the intake pipe 30 is also referred to as a measurement value of MAF. The correction value according to the first embodiment is obtained by dividing a theoretical value of the amount of air passing through the intake pipe 30 by the measurement value of MAF. Hereinafter, the theoretical value of the amount of air passing through the intake pipe 30 is also referred to as a theoretical value of MAF. In addition, a correction value according to another embodiment may be a value, such as a deviation rate between the measurement value of MAF and the theoretical value of MAF. The correction value storage unit 602 stores the correction values in association with three or more air amount regions. FIG. 3 is a diagram illustrating an example of information stored in the correction value storage unit 602 according to the first embodiment. For example, as illustrated in FIG. 3, the correction value storage unit 602 divides the range of the measurement value of MAF into six regions and stores the correction values in association with each of the six regions.

The region specification unit 603 illustrated in FIG. 2 specifies an air amount region to which the measurement value of MAF belongs on the basis of the measurement value of MAF acquired by the measurement value acquisition unit 601.

The correction unit 604 corrects the measurement value of MAF on the basis of the correction value stored in the correction value storage unit 602. That is, the correction unit 604 multiplies the measurement value of MAF by the correction value associated with the region specified by the region specification unit 603 to correct the measurement value of MAF.

The regeneration determination unit 605 determines whether to perform a post-processing regeneration operation for regenerating the DPF 41 on the basis of the measurement value of the differential pressure sensor 411 acquired by the measurement value acquisition unit 601. Specifically, the regeneration determination unit 605 estimates the amount of deposition of the particulate matter in the DPF 41 on the basis of the measurement value of the differential pressure sensor 411 and determines to perform the post-processing regeneration operation in a case in which the amount of deposition is greater than a predetermined threshold value. Further, the regeneration determination unit 605 may determine to perform the post-processing regeneration operation in a case in which a predetermined period time has elapsed since the previous post-processing regeneration operation. The post-processing regeneration operation is an example of the process of regenerating the DPF 41.

The air amount calculation unit 606 calculates the theoretical value of the amount of air (mass charge flow (MCF)) flowing to the intake side of the engine main body 10 on the basis of the measurement values of the rotation speed sensor 101, the temperature sensor 121, and the pressure sensor 122 acquired by the measurement value acquisition unit 601.

That is, the air amount calculation unit 606 calculates the theoretical value of MCF on the basis of volume efficiency and the number of rotations of the engine. Since the degree of opening of the recirculation valve 52 is zero during the post-processing regeneration operation, the theoretical value of MCF is equal to the theoretical value of the amount of air (MAF) passing through the intake pipe 30. That is, it can be said that the value calculated by the air amount calculation unit 606 during the post-processing regeneration operation is the theoretical value of MAF.

The engine control unit 607 determines the fuel injection amount, the degree of opening of the variable nozzle of the supercharger 20, and the degree of opening of the recirculation valve 52 on the basis of the measurement values of the rotation speed sensor 101, the temperature sensor 121, and the pressure sensor 122 acquired by the measurement value acquisition unit 601, the measurement value of MAF corrected by the correction unit 604, and the theoretical value of MCF calculated by the air amount calculation unit 606. The engine control unit 607 multiplies the theoretical value of MCF calculated by the air amount calculation unit 606 by a predetermined recirculation rate to determine the air flow rate of the recirculation pipe 50. The engine control unit 607 determines the degree of opening of the recirculation valve 52 on the basis of the determined flow rate.

However, the engine control unit 607 performs control such that the degree of opening of the recirculation valve 52 is zero regardless of the flow rate during the post-processing regeneration operation. Therefore, it is possible to increase the concentration of oxygen in the intake air and to increase the combustion temperature. Further, the engine control unit 607 performs control such that the degree of opening of the variable nozzle of the supercharger 20 is very small in a case in which the engine main body 10 is operated in a low-speed and low-load region in which the number of rotations and torque of the engine are small. Therefore, it is possible to increase the pumping loss of the engine main body 10 and to increase the temperature of the exhaust gas.

The sampling unit 608 determines whether or not to sample the measurement value of MAF before correction and the theoretical value of MCF calculated by the air amount calculation unit 606 during the post-processing regeneration operation of the engine control unit 607. The accuracy of calculation of the amount of air by the air amount calculation unit 606 is low in a case in which the engine main body 10 is in a transient state. Therefore, the sampling unit 608 determines to sample the measurement value of MAF and the theoretical value of MCF when the rate of change in the number of rotations of the engine and the fuel injection amount is sufficiently small. The sampling unit 608 calculates an average value of the measurement values of MAF, an average value of the theoretical values of MCF, and the number of samples for each air amount region on the basis of the information stored in the sample storage unit 609 and stores the calculated values in the sample storage unit 609. Hereinafter, the average value of the measurement values of MAF is referred to as an average measurement value of MAF and the average value of the theoretical values of MCF is referred to as an average theoretical value of MCF.

The sample storage unit 609 stores the average measurement value of MAF, the average theoretical value of MCF, and the number of samples so as to be associated with each other. FIG. 4 is a diagram illustrating an example of information stored in the sample storage unit 609 according to the first embodiment.

The correction value calculation unit 610 calculates a correction value for each of a plurality of air amount regions on the basis of the information stored in the sample storage unit 609. The correction value calculation unit 610 records the calculated correction value in the correction value storage unit 602.

<<Operation of Engine Controller 60>>

Figure 5:
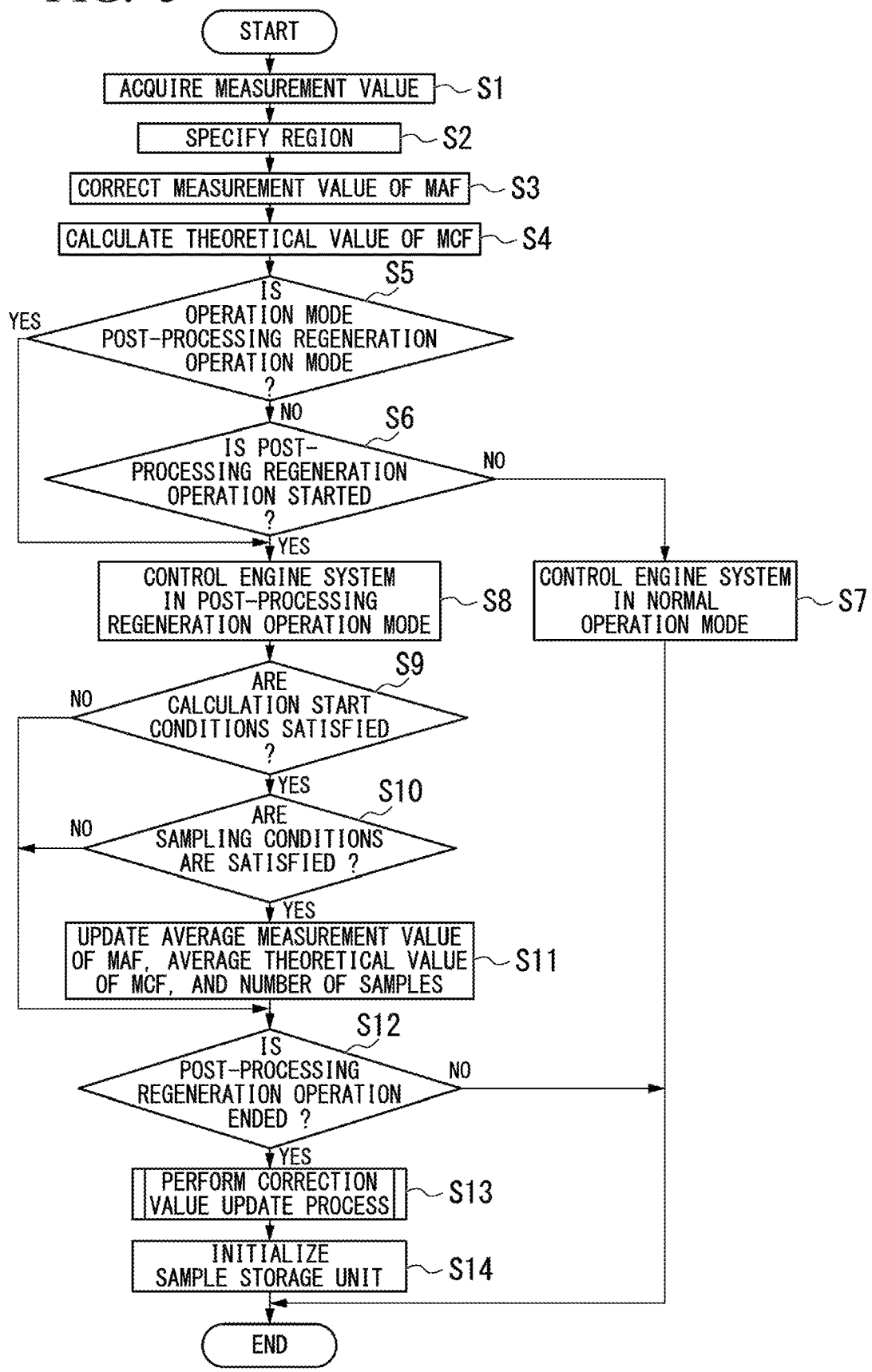
FIG. 5 is a flowchart illustrating an operation of the engine controller according to the first embodiment.

Here, the operation of the engine controller 60 according to the first embodiment will be described. FIG. 5 is a flowchart illustrating the operation of the engine controller 60 according to the first embodiment. When the engine system 1 starts to operate, the engine controller 60 performs a process illustrated in FIG. 5 in every predetermined control cycle.

First, the measurement value acquisition unit 601 acquires measurement values from various sensors (Step S1). Then, the region specification unit 603 specifies a region to which the measurement value of MAF acquired in the step S1 belongs among the plurality of regions stored in the correction value storage unit 602 (Step S2). The correction unit 604 reads out the correction value associated with the region specified in Step S1 from the correction value storage unit 602 and corrects the measurement value of MAF (Step S3). The air amount calculation unit 606 calculates the theoretical value of MCF on the basis of the measurement values of the number of rotations of the engine and the temperature and pressure of the intake manifold 11 acquired in Step S1 (Step S4).

The regeneration determination unit 605 determines whether or not the operation mode of the engine system 1 is a post-processing regeneration operation mode (Step S5). In a case in which the operation mode of the engine system 1 is not the post-processing regeneration operation mode (Step S5: NO), the regeneration determination unit 605 determines whether or not to start the post-processing regeneration operation on the basis of the measurement value of the differential pressure of the DPF 41 acquired in Step S1 (Step S6). The regeneration determination unit 605 may determine whether or not to start the post-processing regeneration operation on the basis of the time elapsed since the previous post-processing regeneration operation. In a case in which the regeneration determination unit 605 determines not to start the post-processing regeneration operation (Step S6: NO), the engine control unit 607 generates control signals for the fuel injection amount, the degree of opening of the variable nozzle of the supercharger 20 and the recirculation valve 52, on the basis of various measurement values acquired in Step S1, the measurement value of MAF corrected in Step S3, and the theoretical value of MCF calculated in Step S4 (Step S7). That is, the engine control unit 607 controls the engine system 1 in a normal operation mode. Then, the engine controller 60 waits until the next control cycle.

On the other hand, in a case in which the operation mode of the engine system 1 is the post-processing regeneration operation mode (Step S5: YES) or in a case in which the regeneration determination unit 605 determines to start the post-processing regeneration operation (Step S6: YES), the engine control unit 607 generates a control signal to set the degree of opening of the recirculation valve 52 to zero (Step S8). That is, the engine control unit 607 controls the engine system 1 in the post-processing regeneration operation mode. Further, the engine control unit 607 performs control such that the degree of opening of the variable nozzle of the supercharger 20 is very small in a case in which the engine main body 10 is operated in a low-speed and low-load region in which the number of rotations and torque of the engine are small.

Then, the sampling unit 608 determines whether or not correction value calculation start conditions are satisfied (Step S9). The calculation start conditions according to the first embodiment are that a predetermined period of time has passed since the closing of the recirculation valve 52, the temperature of cooling water is equal to or greater than a predetermined threshold value (for example, 72° C.), a working altitude is equal to or less than a predetermined altitude (for example, 4600 m), and there is no failure in each component of the engine system 1 (for example, the supercharger 20, the recirculation valve 52, the rotation speed sensor 101, the temperature sensor 121, the pressure sensor 122, and the differential pressure sensor 411). Examples of the component failure include the output of an abnormal value and malfunction. The calculation start conditions are not limited thereto. In another embodiment, for example, the calculation start condition may be only the elapse of a predetermined period of time since the closing of the recirculation valve 52.

In a case in which the calculation start conditions are satisfied (Step S9: YES), the sampling unit 608 determines whether or not the sampling conditions of the measurement value of MAF and the theoretical value of MCF are satisfied on the basis of the state of the engine system 1 (Step S10). The sampling conditions according to the first embodiment are that the engine system 1 is not accelerating, the operation region of the engine system 1 is not the low-speed and low-load region (the degree of opening of the variable nozzle of the supercharger 20 is not very small), the absolute value of the difference between the measurement value and target value of the pressure of the intake manifold 11 is equal to or less than a predetermined pressure deviation threshold value, the rate of change in the number of rotations of the engine is equal to or less than a predetermined threshold value, and the rate of change in the fuel injection amount is equal to or less than a predetermined threshold value. In a case in which the rates of change in the number of rotations of the engine and the fuel injection amount are calculated, it is preferable to apply a low-pass filter to the measurement values of the number of rotations of the engine and the fuel injection amount.

Figure 6:
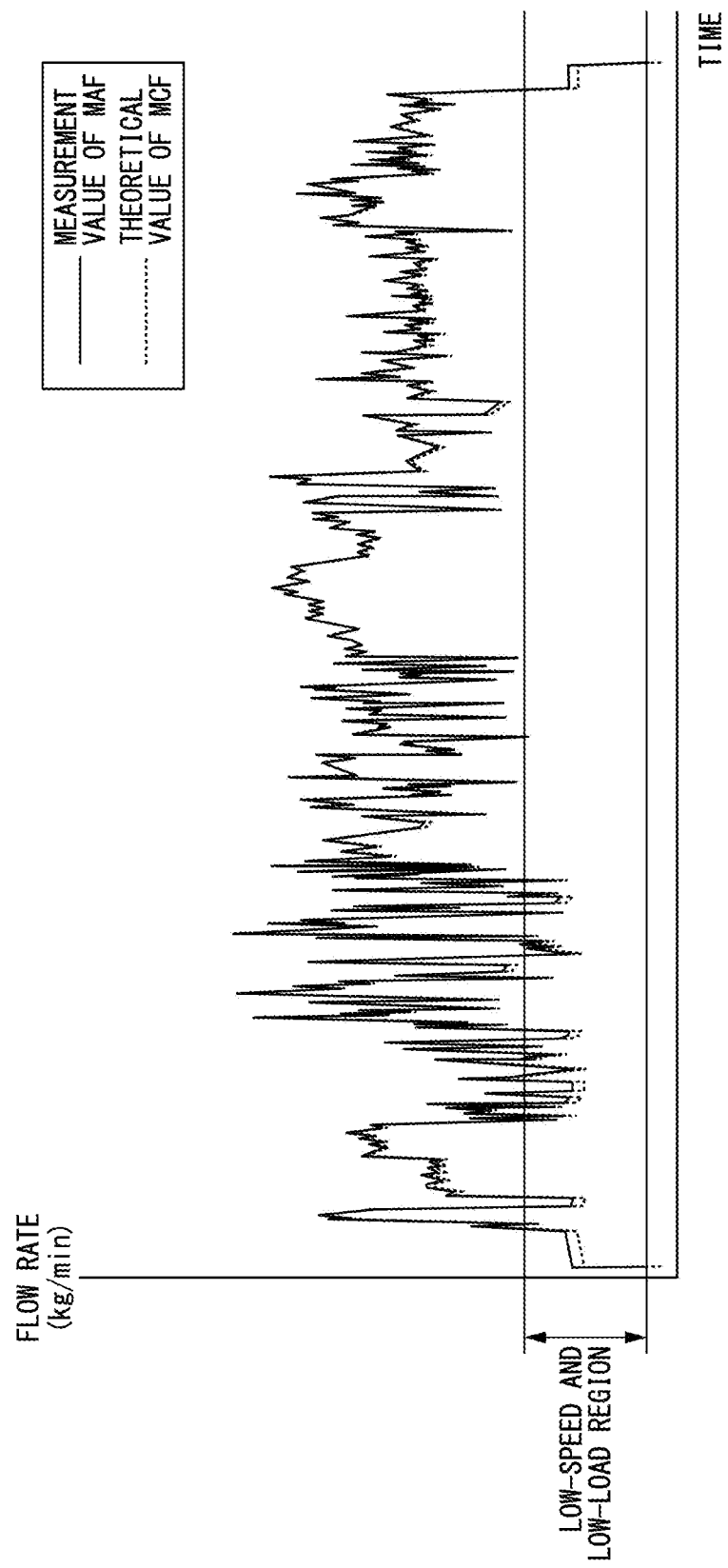
FIG. 6 is a diagram illustrating a time series of MAF and MCF according to experimental results using the engine system.

Here, the reason why sampling is not performed in a case in which the engine main body 10 is operated in the low-speed and low-load region will be described. FIG. 6 is a diagram illustrating a time series of the measurement value of MAF and the theoretical value of MCF according to experimental results using the engine system. In FIG. 6, a solid line indicates the measurement value of MAF and a dotted line indicates the theoretical value of MCF.

In a case in which the engine main body 10 is operated in the low-speed and low-load region, a special operation is performed which reduces the degree of opening of the variable nozzle of the supercharger 20 to a very small value to increase the pumping loss of the engine main body 10 in Step S8. Therefore, as illustrated in FIG. 6, the error between the measurement value of MAF and the theoretical value of MCF in the low-speed and low-load region is larger than that in other regions. Therefore, sampling is not performed in the low-speed and low-load region, in which the error between the measurement value of MAF and the theoretical value of MCF is large, to reduce noise in the sample. In addition, for an engine in which the error between the measurement value of MAF and theoretical value of MCF does not increase in the low-speed and low-load region, sampling may be performed even in a case in which the engine is operated in the low-speed and low-load region.

The invention is not limited thereto. In another embodiment, for example, in a case in which the engine system 1 includes an exhaust throttle valve, the sampling conditions may further include that the degree of opening of the throttle valve is equal to or less than a threshold value.

Returning to FIG. 5, in a case in which the sampling conditions are satisfied (Step S10: YES), the sampling unit 608 updates the average measurement value of MAF, the average theoretical value of MCF, and the number of samples on the basis of the measurement value of MAF acquired in Step S1, the theoretical value of MCF calculated in Step S4, and the information stored in the sample storage unit 609 in association with the region specified in Step S2 (Step S11). For example, the sampling unit 608 updates the average measurement value of MAF, the average theoretical value of MCF, and the number of samples in the following procedure.

The sampling unit 608 reads out the average measurement value of MAF, the average theoretical value of MCF, and the number of samples associated with the region specified in Step S2 from the sample storage unit 609. The sampling unit 608 updates the average theoretical value $m_{ave}(t)$ of MAF according to the following Expression (1).

Here, t indicates the current time.

[Expression 1]

$$m_{ave}(t) = \frac{n \cdot m_{ave}(t-1) + m(t)}{n+1} \quad (1)$$

Here, n indicates the number of samples stored in the sample storage unit 609. In addition, $m_{ave}(t-1)$ indicates the previous (time t−1) average measurement value stored in the sample storage unit 609. Further, m(t) indicates the measurement value of MAF at a time t.

The sampling unit 608 adds 1 to the number of samples to update the number of samples. In another embodiment, all of the samples may be sequentially stored in the sample storage unit and the average measurement value of MAF, the average theoretical value of MCF, and the number of samples may be calculated. In this case, the sampling unit 608 may calculate the average measurement value of MAF, the average theoretical value of MCF, and the number of samples using the samples within 3σ of the standard deviation. The sampling unit 608 stores the updated average measurement value of MAF, the updated average theoretical value of MCF, and the updated number of samples in the sample storage unit 609.

When the calculation start conditions or the sampling conditions are not satisfied (Step S9 or S10: NO), or when the sampling unit 608 updates the information stored in the sample storage unit 609 (Step S11), the regeneration determination unit 605 determines whether or not to end the post-processing regeneration operation mode (Step S12). The regeneration determination unit 605 determines whether or not to end the post-processing regeneration operation mode on the basis of, for example, whether or not a predetermined period of time has elapsed since the start of the post-processing regeneration operation and whether or not the DPF 41 has reached a predetermined temperature. In a case in which the post-processing regeneration operation mode is not ended (Step S12: NO), the engine controller 60 waits until the next control cycle.

In a case in which the post-processing regeneration operation mode is ended (Step S12: YES), the correction value calculation unit 610 performs a correction value update process to update the correction values stored in the correction value storage unit 602 (Step S13). The correction value update process will be described in detail below. When the correction value is updated, the correction value calculation unit 610 initializes the information stored in the sample storage unit 609 (Step S14). Then, the engine controller 60 waits until the next control cycle.

As such, according to the first embodiment, the engine controller 60 can update the correction value during the post-processing regeneration operation, that is, during the process of regenerating the DPF 41. During the post-processing regeneration operation, the degree of opening of the recirculation valve 52 is always zero. Therefore, the holding time of the steady state required for updating the correction value is shorter than that in a case in, after the engine main body 10 is changed to the steady state, the engine controller closes the recirculation valve 52, waits for stabilization, and updates the correction value.

As a result, the engine system 1 can accurately correct the measurement value of the mass flow sensor 32 during the normal operation of a work machine.

<<Correction Value Update Process>>

Hereinafter, the correction value update process in Step S13 will be described.

Figure 7:
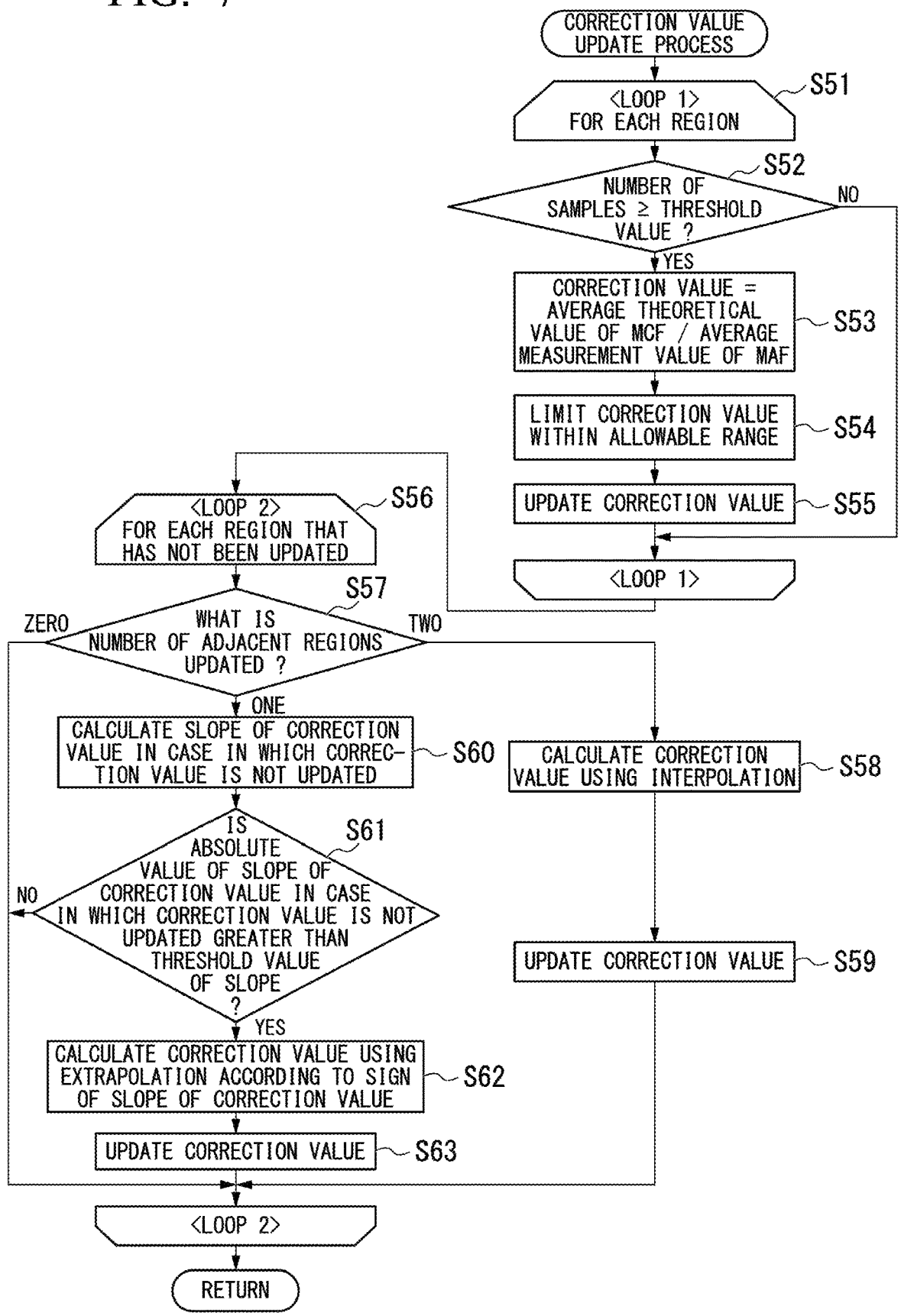
FIG. 7 is a flowchart illustrating a correction value update process according to the first embodiment.

FIG. 7 is a flowchart illustrating the correction value update process according to the first embodiment.

When the correction value calculation unit 610 starts the correction value update process, it selects the air amount regions one by one (Step S51) and performs a process in the following Steps S52 to S55 for the selected region.

The correction value calculation unit 610 determines whether or not the number of samples stored in the sample storage unit 609 in association with the region selected in Step S51 is equal to or greater than a predetermined sample number threshold value (Step S52). In a case in which the number of samples stored in association with the region selected in Step S51 is less than the sample number threshold value (Step S52: NO), the update of the correction value related to the region is suspended. On the other hand, in a case in which the number of samples stored in association with the region selected in Step S51 is equal to or greater than the sample number threshold value (Step S52: YES), the average theoretical value of MCF stored in the sample storage unit 609 in association with the region selected in step S51 is divided by the average measurement value of MAF to calculate a correction value (Step S53). As such, the correction value is calculated for the region in which a sufficient number of samples are ensured, which makes it possible to ensure the reliability of the correction value.

Figure 8:
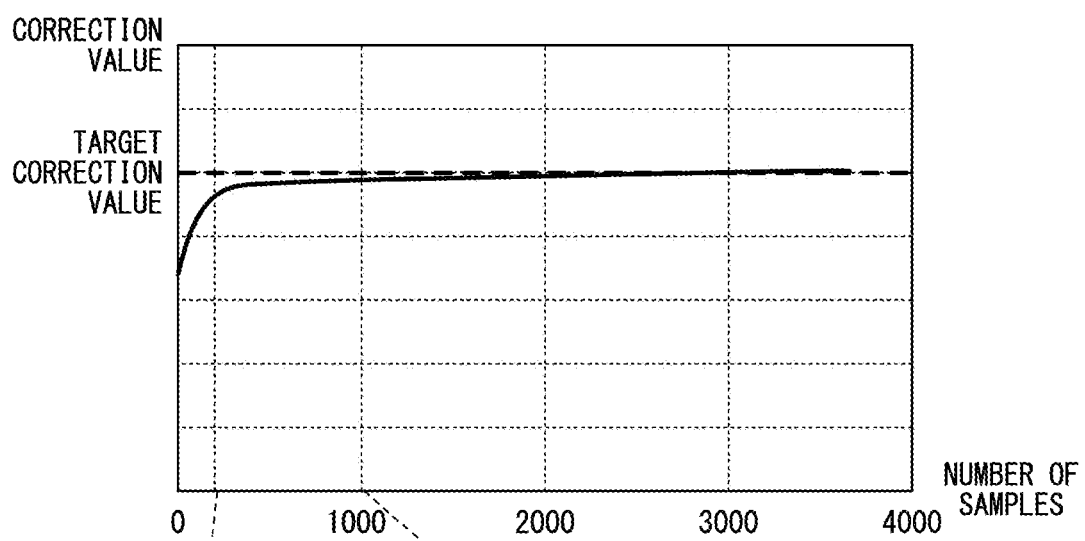
FIG. 8 is a diagram illustrating a relationship between the number of samples and a correction value according to the experimental results using the engine system.
Figure 8:
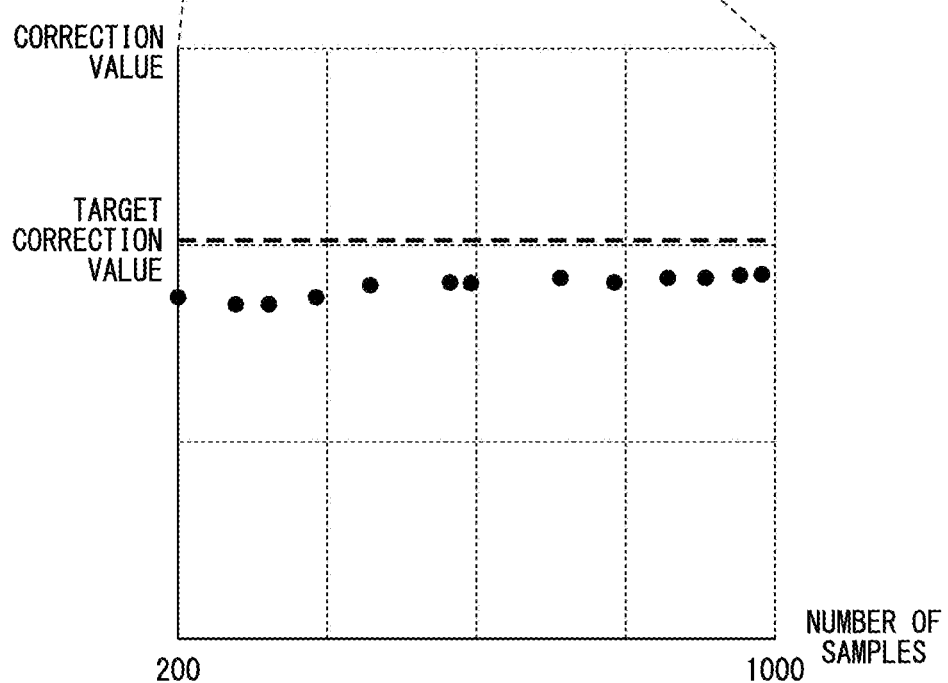

FIG. 8 is a diagram illustrating the relationship between the number of samples and the correction value according to the experimental results using the engine system 1 according to the first embodiment. As illustrated in FIG. 8, in a region in which the number of samples is less than 200, the calculated correction value greatly deviates from a target correction value. On the other hand, it can be seen that, when the number of samples is equal to or greater than 200, the deviation from the target correction value is significantly reduced. Further, it can be seen that a variation in the calculated correction value in the vertical direction is small when the number of samples is equal to or greater than 800 and the calculated correction value is substantially equal to the target correction value when the number of samples is equal to or greater than 1000. Therefore, the sample number threshold value is preferably equal to or greater than 200, more preferably equal to or greater than 800, and most preferably equal to or greater than 1000.

Returning to FIG. 7, the correction value calculation unit 610 limits the calculated correction value to a value within a predetermined allowable range (Step S54). That is, in a case in which the calculated correction value is greater than the upper limit of the allowable range, the correction value calculation unit 610 updates the correction value to the upper limit. Further, in a case in which the calculated correction value is less than the lower limit of the allowable range, the correction value calculation unit 610 updates the correction value to the lower limit.

The correction value calculation unit 610 updates the correction value stored in the correction value storage unit 602 in association with the region selected in Step S51 (Step S55).

Then, the correction value calculation unit 610 selects the regions, for which the correction values have not been updated in Steps S51 to S55, one by one (Step S56) and performs the process in the following Steps S57 to S62 for the selected region.

The correction value calculation unit 610 specifies the number of regions, for which the correction values have been updated in Steps S51 to S55, among regions adjacent to the region selected in Step S56 (Step S57). In the example illustrated in FIG. 3, in a case in which a region of 6 to 8 kg/min is selected in Step S56, the correction value calculation unit 610 determines whether the correction values for both a region of 4 to 6 kg/min and a region of 8 to 10 kg/min have been updated, one of the correction values has been updated, and neither of the correction values has been updated. Further, in the example illustrated in FIG. 3, in a case in which a region of 16 to 18 kg/min is selected in Step S56, the correction value calculation unit 610 determines whether or not the correction value for a region of 12 to 14 kg/min has been updated.

In a case in which neither of the correction values for adjacent regions has been updated (Step S57: zero), the correction value calculation unit 610 does not update the correction value for the region selected in Step S56 and maintains the previous correction value.

Figure 9:
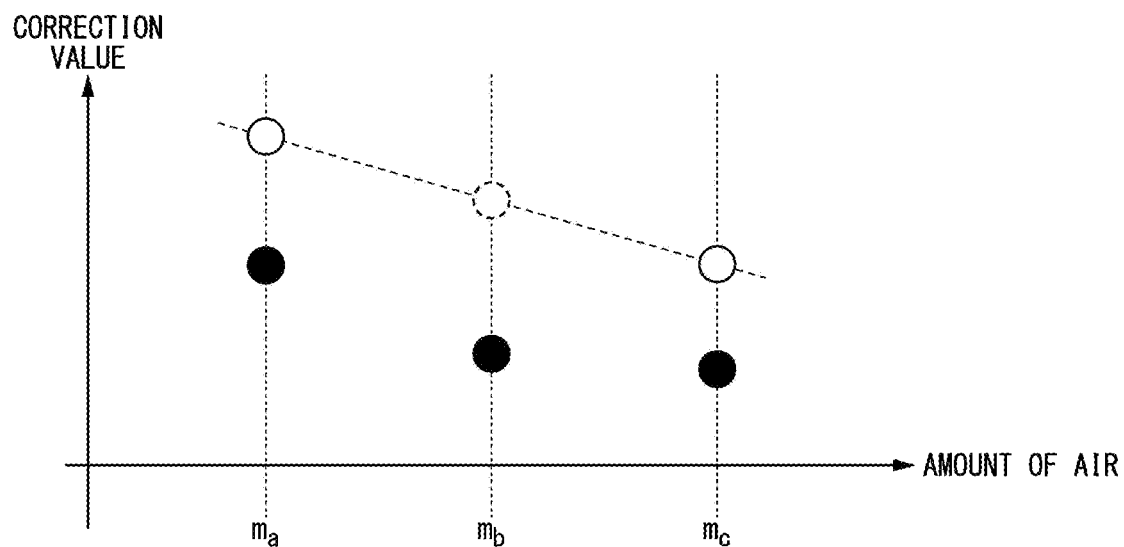
FIG. 9 is a diagram illustrating a method for updating the correction value in a case in which the correction values for two adjacent regions have been updated in the first embodiment.

FIG. 9 is a diagram illustrating a correction value update method in a case in which the correction values for two adjacent regions have been updated in the first embodiment. In FIG. 9, a black plot indicates the correction value before update and a white plot indicates the updated correction value. Further, among the white plots, a white plot having a dotted contour line indicates a correction value obtained by interpolation. In a case in which the correction values for two adjacent regions have been updated (Step S57: two), the correction value calculation unit 610 calculates the correction value for the region using the interpolation of the correction values for the two adjacent regions (Step S58). For example, as illustrated in FIG. 9, in a case in which a correction value for a region $m_b$ is updated, the correction value calculation unit 610 determines an average value of the correction values for two adjacent regions $m_a$ and $m_c$ as the correction value for the region $m_b$. The correction value calculation unit 610 updates the correction value stored in the correction value storage unit 602 in association with the region selected in Step S56 (Step S59).

In a case in which the correction value for one adjacent region has been updated (Step S57: one), the correction value calculation unit 610 calculates the slope of the correction value when the correction value is not updated, on the basis of the previous correction value and the correction value for the one region (Step S60). Specifically, the correction value calculation unit 610 calculates the slope d of the correction value when the correction value is not updated, using the following Expression (2).

$$d=(k_{a1}-k_{b0})/(m_a-m_b) \quad (2)$$

Here, $k_{a1}$ indicates the updated correction value related to the adjacent region. Further, $k_{b0}$ indicates the previous correction value for the region. Further, $m_a$ indicates the median of the flow rate of the adjacent region. Further, $m_b$ indicates the median of the flow rate of the region.

Then, the correction value calculation unit 610 determines whether or not the absolute value d of the calculated slope is greater than a threshold value dk of the slope determined in the design (Step S61).

Figure 10A:
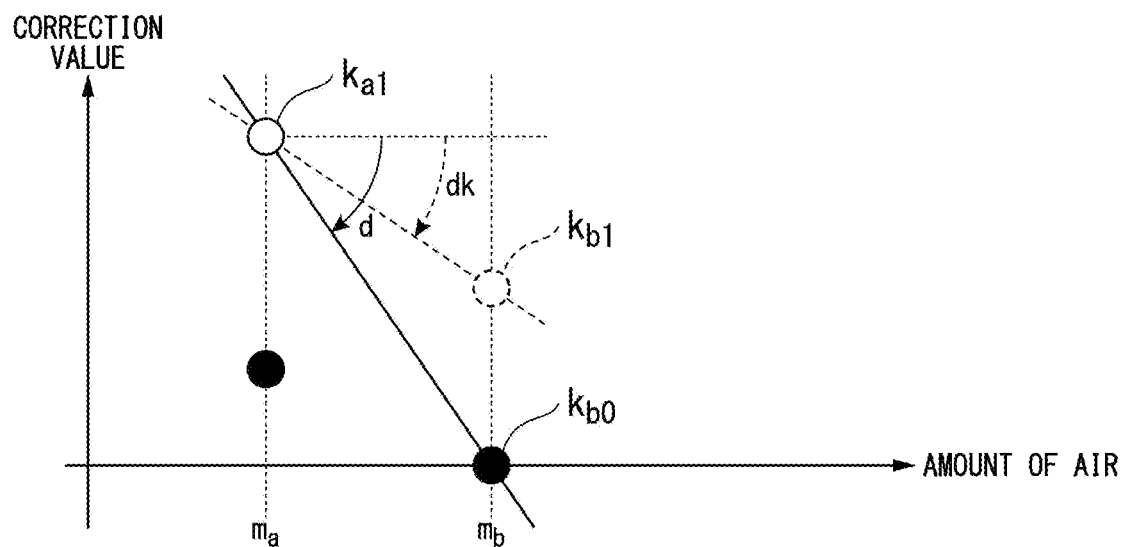
FIG. 10A is a first diagram illustrating a relationship between a slope and a threshold value of the slope and a relationship with the correction value in the first embodiment.
Figure 10B:
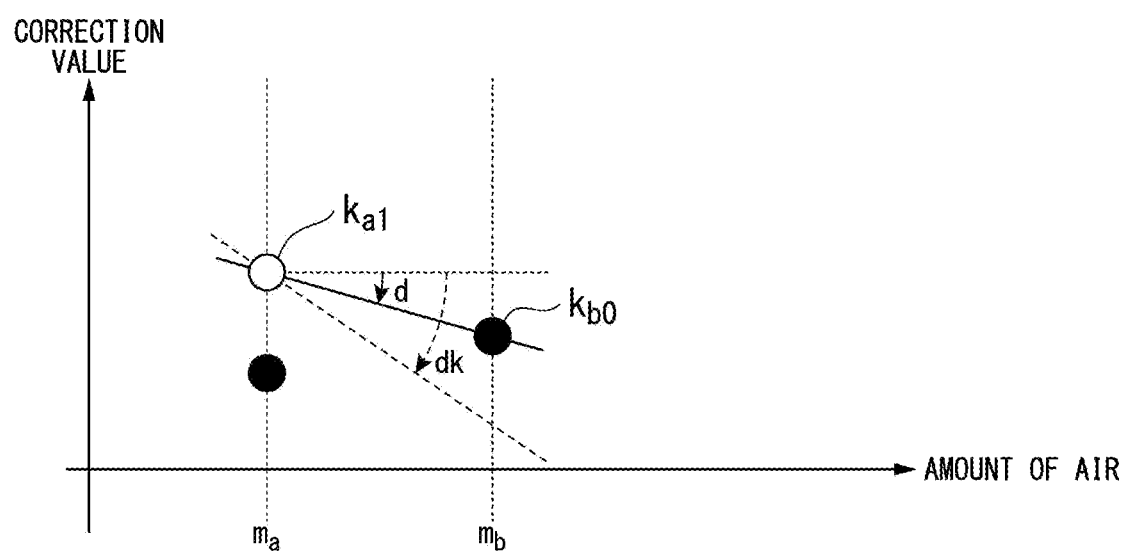
FIG. 10B is a second diagram illustrating the relationship between the slope and the threshold value of the slope and the relationship with the correction value in the first embodiment.
Figure 10C:
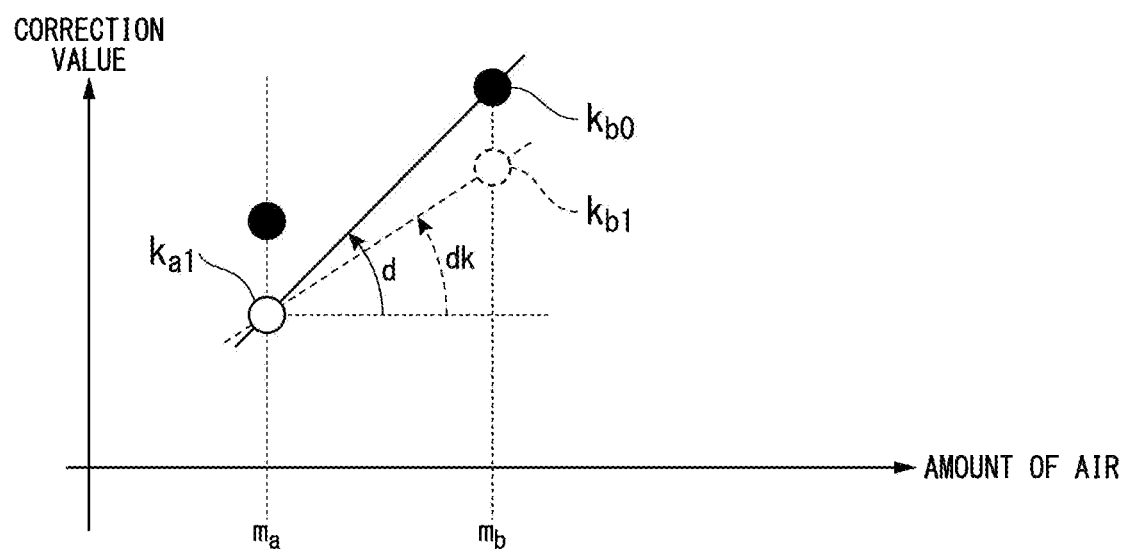
FIG. 10C is a third diagram illustrating the relationship between the slope and the threshold value of the slope and the relationship with the correction value in the first embodiment.

FIGS. 10A, 10B, and IOC are diagrams illustrating the relationship between the slope d and the threshold value dk of the slope and the relationship with the correction value according to the first embodiment. In FIGS. 10A to 10C, a black plot indicates the correction value before update and a white plot indicates the updated correction value. Further, in the white plots, a white plot having a dotted contour line indicates the correction value calculated by extrapolation.

As illustrated in FIGS. 10A and 10C, in a case in which the absolute value of the slope d is greater than the threshold value dk of the slope (Step S61: YES), the correction value calculation unit 610 calculates the correction value for the region using the extrapolation of the updated correction value for the adjacent region according to the sign of the slope d (Step S62). Specifically, in a case in which the sign of the slope is negative as illustrated in FIG. 10A, the correction value calculation unit 610 calculates the correction value $k_{b1}$ for the region using the following Expression (3). Further, in a case in which the sign of the slope is positive as illustrated in FIG. 10C, the correction value calculation unit 610 calculates the correction value $k_{b1}$ for the region using the following Expression (4).

$$k_{b1}=k_{a1}-dk(|m_a-m_b|) \quad (3)$$

$$k_{b1}=k_{a1}+dk(|m_a-m_{b1}|) \quad (4)$$

Then, the correction value calculation unit 610 updates the correction value stored in the correction value storage unit 602 in association with the region selected in Step S56 (Step S63). On the other hand, in a case in which the absolute value of the slope d is equal to or less than the threshold value dk of the slope as illustrated in FIG. 10B (Step S61: NO), the correction value calculation unit 610 does not update the correction value for the region selected in Step S56 and maintains the previous correction value.

As described above, according to the first embodiment, for a region having a sufficient number of samples among a plurality of air amount regions, the engine controller 60 divides the average theoretical value of MCF by the average measurement value of MAF to calculate the correction value. Therefore, it is possible to calculate the correction value while ensuring reliability. On the other hand, for a region having an insufficient number of samples, the engine controller 60 updates the correction value using the correction values for adjacent regions. Therefore, it is possible to calculate the correction value even for the region having an insufficient number of samples.

OTHER EMBODIMENTS

One embodiment has been described in detail above with reference to the drawings. However, the specific configuration is not limited to the above and, for example, the design can be changed in various ways. That is, in another embodiment, the order of the above-mentioned processes may be changed appropriately. In addition, some of the processes may be performed in parallel.

The engine controller 60 according to the above-described embodiment may be configured by a single computer 90. Alternatively, the configuration of the engine controller 60 may be divided into a plurality of computers 90 and the plurality of computers 90 may cooperate with each other to function as the engine controller 60. In this case, some of the computers 90 forming the engine controller 60 may be provided in the work machine equipped with the engine system 1 and the other computers 90 may be provided outside the work machine.

The engine controller 60 according to the above-described embodiment calculates the correction value for each of three or more air amount regions. However, the number of air amount regions is not limited thereto in other embodiments. For example, in another embodiment, the correction value may be calculated for two air amount regions, or one correction value may be calculated regardless of the air amount region.

Further, for the region in which the number of samples is less than the sample number threshold value, the engine controller 60 according to the above-described embodiment calculates the correction value on the basis of the correction values for other regions adjacent to the region. However, in another embodiment, the calculation of the correction value is not limited thereto. For example, an engine controller 60 according to another embodiment may calculate the correction value on the basis of the average value and the theoretical value, regardless of the number of samples.

In addition, a correction value calculation unit 610 according to another embodiment may have the correction value as a function, instead of the table illustrated in FIG. 3. The correction value may also be represented by a trained model. For example, a correction value calculation unit 610 according to another embodiment may train a learning model, using as the measurement value of MAF as an input sample and the theoretical value of MCF as an output sample, to generate the trained model as the correction value.

Further, the engine controller 60 according to the above-described embodiment calculates the correction value during the regeneration operation of the DPF 41. However, in another embodiment, the invention is not limited to thereto. For example, in a case in which an engine system 1 according to another embodiment includes a selective catalytic reduction (SCR) system, the engine controller 60 may calculate the correction value during the regeneration operation of the SCR system. The SCR system is a removal device that removes nitrogen oxide from the exhaust gas. The nitrogen oxide is an example of the air pollutants.

<Configuration of Computer>

Figure 11:
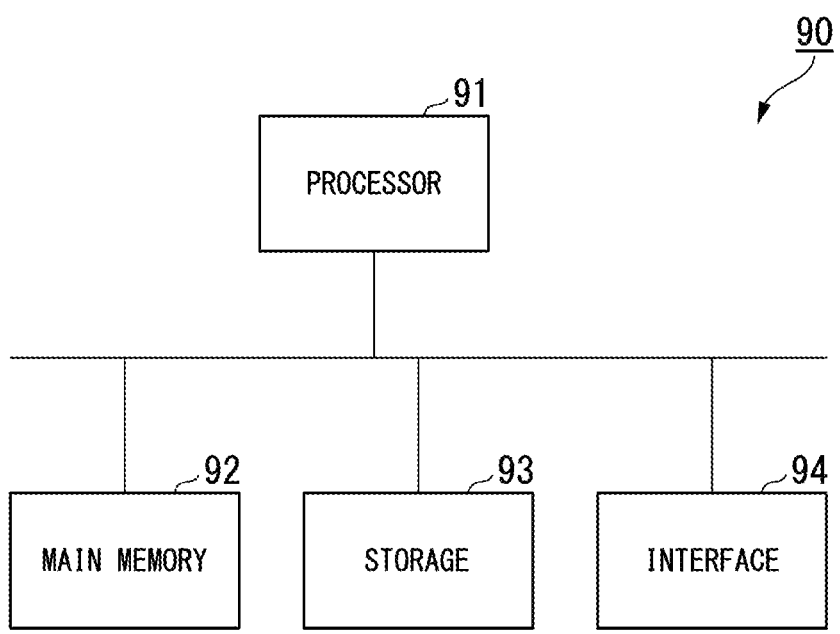
FIG. 11 is a schematic block diagram illustrating a configuration of a computer according to at least one embodiment.

FIG. 11 is a schematic block diagram illustrating the configuration of the computer 90 according to at least one embodiment.

The computer 90 includes a processor 91, a main memory 92, a storage 93, and an interface 94.

The engine controller 60 is implemented in the computer 90. The operation of each the above-mentioned processing units is stored in the storage 93 in the form of a program. The processor 91 reads out the program from the storage 93, loads the program in the main memory 92, and performs the above-mentioned process according to the program. Further, the processor 91 ensures storage areas corresponding to each of the above-mentioned storage units in the main memory 92 according to the program. Examples of the processor 91 include a central processing unit (CPU), a graphic processing unit (GPU), and a microprocessor.

The program may be used to implement some of the functions of the computer 90. For example, the program may be combined with another program which has already been stored in the storage 93 or another program installed in another device to implement the functions. In another embodiment, the computer 90 may include a custom large scale integrated circuit (LSI), such as a programmable logic device (PLD) in addition to or instead of the above-mentioned configuration. Examples of the PLD include a programmable array logic (PAL), a generic array logic (GAL), a complex programmable logic device (CPLD), and a field programmable gate array (FPGA). In this case, some or all of the functions implemented by the processor 91 may be implemented by the integrated circuit. The integrated circuit is also included in the example of the processor 91.

Examples of the storage 93 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 93 may be an internal medium that is directly connected to a bus of the computer 90 or an external medium that is connected to the computer 90 through the interface 94 or a communication line. Further, in a case in which this program is distributed to the computer 90 through the communication line, the computer 90 that has received the distributed program may expand the program in the main memory 92 and perform the above-mentioned process. In at least one embodiment, the storage 93 is a non-transitory tangible storage medium.

Further, the program may be used to implement some of the above-mentioned functions. In addition, the program may be a so-called difference file (difference program) that implements the above-mentioned functions in combination with another program that has already been stored in the storage 93.

INDUSTRIAL APPLICABILITY

The engine system can accurately correct the measurement value of the mass flow sensor during the normal operation of the work machine.

REFERENCE SIGNS LIST

1 Engine system
10 Engine main body
30 Intake pipe
32 Mass flow sensor
40 Exhaust pipe
50 Recirculation pipe
52 Recirculation valve
60 Engine controller
604 Correction unit
606 Air amount calculation unit
610 Correction value calculation unit

The invention claimed is:
1. An engine system comprising:
an engine main body;
an intake pipe that is connected to an intake side of the engine main body;

a mass flow sensor that is provided in the intake pipe and outputs a measurement value of an amount of air passing through the intake pipe;
an exhaust pipe that is connected to an exhaust side of the engine main body;
a removal device that is provided in the exhaust pipe and removes an air pollutant included in an exhaust gas passing through the exhaust pipe;
a recirculation pipe that connects the exhaust side of the engine main body and the intake pipe;
a recirculation valve that controls a flow rate of the exhaust gas flowing from the recirculation pipe to the intake pipe;
a regeneration control unit that closes the recirculation valve to perform a process of regenerating the removal device;
an air amount calculation unit that calculates a theoretical value of an amount of air flowing to the intake side of the engine main body on the basis of a quantity of state of the engine main body during the regeneration process; and
a correction unit that corrects the measurement value on the basis of the measurement value and the theoretical value during the regeneration process.

2. The engine system according to claim 1, further comprising:
a correction value calculation unit that calculates a correction value for correcting the measurement value for each of three or more air amount regions on the basis of the measurement value and the theoretical value during the regeneration process,
wherein the correction unit corrects the measurement value using the correction value related to a region, to which the measurement value belongs, among the three or more regions.

3. The engine system according to claim 2,
wherein the correction value calculation unit calculates the correction value on the basis of the measurement value and the theoretical value during the regeneration process for a region which satisfies predetermined conditions among the three or more regions, and calculates the correction value for a region which does not satisfy the conditions on the basis of the correction values for other regions adjacent to the region.

4. The engine system according to claim 3,
wherein the correction value calculation unit calculates the correction value for the region which does not satisfy the conditions among the three or more regions, on the basis of the correction values for two adjacent regions on both sides of the region.

5. The engine system according to claim 3,
wherein the correction value calculation unit calculates a candidate correction value for the region which does not satisfy the conditions among the three or more regions, on the basis of the correction values for other regions adjacent to the region, and compares the candidate correction value with a previous correction value for the region to determine whether to use the candidate correction value or the previous correction value as a current correction value for the region.

6. The engine system according to claim 3,
wherein the conditions include that the number of samples of the measurement value belonging to the region is equal to or greater than a predetermined threshold value.

7. A method for controlling an engine including an engine main body, an intake pipe that is connected to an intake side of the engine main body, a mass flow sensor that is provided in the intake pipe and outputs a measurement value of an amount of air passing through the intake pipe, an exhaust pipe that is connected to an exhaust side of the engine main body, a removal device that is provided in the exhaust pipe and removes an air pollutant included in an exhaust gas passing through the exhaust pipe, a recirculation pipe that connects the exhaust side of the engine main body and the intake pipe, and a recirculation valve that controls a flow rate of the exhaust gas flowing from the recirculation pipe to the intake pipe, the method comprising the steps of:
closing the recirculation valve to perform a process of regenerating the removal device;
calculating a theoretical value of an amount of air flowing to the intake side of the engine main body on the basis of a quantity of state of the engine main body during the regeneration process; and
correcting the measurement value on the basis of the measurement value and the theoretical value during the regeneration process.

8. The engine system according to claim 4,
wherein the correction value calculation unit calculates a candidate correction value for the region which does not satisfy the conditions among the three or more regions, on the basis of the correction values for other regions adjacent to the region, and compares the candidate correction value with a previous correction value for the region to determine whether to use the candidate correction value or the previous correction value as a current correction value for the region.

9. The engine system according to claim 4,
wherein the conditions include that the number of samples of the measurement value belonging to the region is equal to or greater than a predetermined threshold value.

10. The engine system according to claim 5,
wherein the conditions include that the number of samples of the measurement value belonging to the region is equal to or greater than a predetermined threshold value.

11. The engine system according to claim 8,
wherein the conditions include that the number of samples of the measurement value belonging to the region is equal to or greater than a predetermined threshold value.

* * * * *